United States Patent
Zhao et al.

(10) Patent No.: US 7,006,829 B2
(45) Date of Patent: Feb. 28, 2006

(54) METHOD AND SYSTEM FOR ROUTING A TELEPHONE CALL

(75) Inventors: Wei Zhao, Alpharetta, GA (US); James C. Bedingfield, Sr., Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 214 days.

(21) Appl. No.: 10/438,518

(22) Filed: May 14, 2003

(65) Prior Publication Data

US 2004/0229620 A1 Nov. 18, 2004

(51) Int. Cl.
*H04Q 7/20* (2006.01)

(52) U.S. Cl. .......... 455/445; 455/428; 455/404.1; 455/404.2; 455/456.1; 455/456.5; 455/414.1

(58) Field of Classification Search ............... 455/445, 455/428, 404.1, 404.2, 456.1, 456.3, 456.5, 455/456.6, 410, 411, 414.1
See application file for complete search history.

(56) References Cited

U.S. PATENT DOCUMENTS

| | | | |
|---|---|---|---|
| 5,563,931 A * | 10/1996 | Bishop et al. ........... 455/404.1 |
| 5,873,040 A | 2/1999 | Dunn et al. .................. 455/456 |
| 5,930,713 A * | 7/1999 | Nguyen ....................... 455/440 |
| 6,032,043 A * | 2/2000 | Houde .......................... 455/433 |
| 6,073,005 A | 6/2000 | Raith et al. .................. 455/404 |
| 6,134,433 A * | 10/2000 | Joong et al. ................. 455/417 |
| 6,198,921 B1 * | 3/2001 | Youssefzadeh et al. ..... 455/428 |
| 6,236,365 B1 * | 5/2001 | LeBlanc et al. ............. 342/457 |
| 6,249,252 B1 | 6/2001 | Dupray ....................... 342/450 |
| 6,393,288 B1 * | 5/2002 | Sollee et al. ................ 455/445 |
| 6,424,837 B1 | 7/2002 | Hall et al. ................... 455/456 |
| 6,522,882 B1 | 2/2003 | Chen et al. ................. 455/439 |
| 6,542,476 B1 * | 4/2003 | Elizondo et al. ............ 370/278 |
| 6,711,240 B1 * | 3/2004 | Contractor ............... 379/88.12 |
| 2002/0013163 A1 * | 1/2002 | O'Prey ....................... 455/558 |
| 2002/0054667 A1 * | 5/2002 | Martinez ...................... 379/45 |
| 2003/0114154 A1 * | 6/2003 | Lin et al. .................... 455/432 |

\* cited by examiner

*Primary Examiner*—Sonny Trinh
*Assistant Examiner*—Huy Phan
(74) *Attorney, Agent, or Firm*—Cantor Colburn LLP

(57) ABSTRACT

A method of routing a telephone call includes receiving the call from a mobile unit in signal communication with a cellular telephone system, and routing the call based at least partially on the geographical location and independent of the number plan area code of the mobile unit.

12 Claims, 4 Drawing Sheets

METHOD AND SYSTEM FOR ROUTING A TELEPHONE CALL

BACKGROUND OF THE INVENTION

The present disclosure relates generally to the routing of a telephone call from a mobile unit, and particularly to the routing of an emergency telephone call from a cellular phone in signal communication with a cellular telephone system.

Cellular telephones include an area code similar to land based telephones referred to as the Number Plan Area (NPA) code, which associates the cellular phone (cellphone) with a particular geographic location. When placing a call to or from a cellphone, the NPA code is used to associate the cellphone with a particular Service Control Point (SCP), which is a processing facility for managing the call connections. A cellphone having a NPA code in a first geographic region but being physically located in a second geographic region will have call features managed by the SCP in the first geographic region, even though the first geographic region may be located at a substantial distance from the actual location of the cellphone in the second geographic region. For a non-emergency cellphone call, this arrangement is appropriate for the purpose of providing cellphone features. However, for an emergency cellphone call it would be advantageous to have a cellular telephone system (CTS) capable of more effectively routing the emergency cellphone call.

In a landline emergency 911 (E911) system, an E911 tandem switch routes calls to the proper Public Safety Answering Point (PSAP) based on the Numbering Plan Area Code (NPA-NXX) of the calling number. Once the call arrives at the PSAP, the PSAP can access the Automatic Location Identification (ALI) database to obtain geographic mapping information about the location of the calling number, based on all 10 digits of the calling number.

Present Wireless E911 (WE911) system uses one to three "pseudo" phone numbers associated with each cell tower. WE911 calls using this system are routed to the PSAP on the basis of the phone number associated with the cell tower, using the E911 tandem described above. In response, the ALI database retrieves information about the cell site. Since the cell tower possibly uses more than one "pseudo" phone number, this system does not report the accurate location of the caller.

While some caller location information is available for wireless callers, improvement in the art is still needed for more effective WE911 call routing.

SUMMARY OF THE INVENTION

In one embodiment, a method of routing a telephone call includes receiving the call from a mobile unit in signal communication with a cellular telephone system, and routing the call based at least partially on the geographical location and independent of the number plan area code of the mobile unit.

In another embodiment, a method of routing a telephone call includes receiving the call at a mobile switching center from a mobile unit, sending call information to and receiving call information at a service control point that services the geographic area from which the call originated, and providing call routing information based at least partially on the geographical location of the mobile unit.

In a further embodiment, a system for routing a telephone call includes a mobile switching center adapted to receive the telephone call from a mobile unit, a signal transfer point in signal communication with the mobile switching center, and a service control point in signal communication with the signal transfer point. The service control point is designated to service a defined geographic area and has a database containing geographic data relating to at least one of the mobile switching center, the service control point, and a public safety answering point in the defined geographic area.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides a method of routing a telephone call, such as a 911 emergency call for example, from a cellphone user, or mobile unit generally, to a local Public Safety Answering Point (PSAP), such as a 911 emergency call center for example, based on geographic information relating to the location of the caller. While embodiments described herein depict an emergency call as an exemplary call from a mobile unit, it will be appreciated that the disclosed invention is also applicable to other telephone calls from mobile units, such as a call requesting operator assistance for example, which would then be routed to an operator who is local to the caller.

Figure 1:
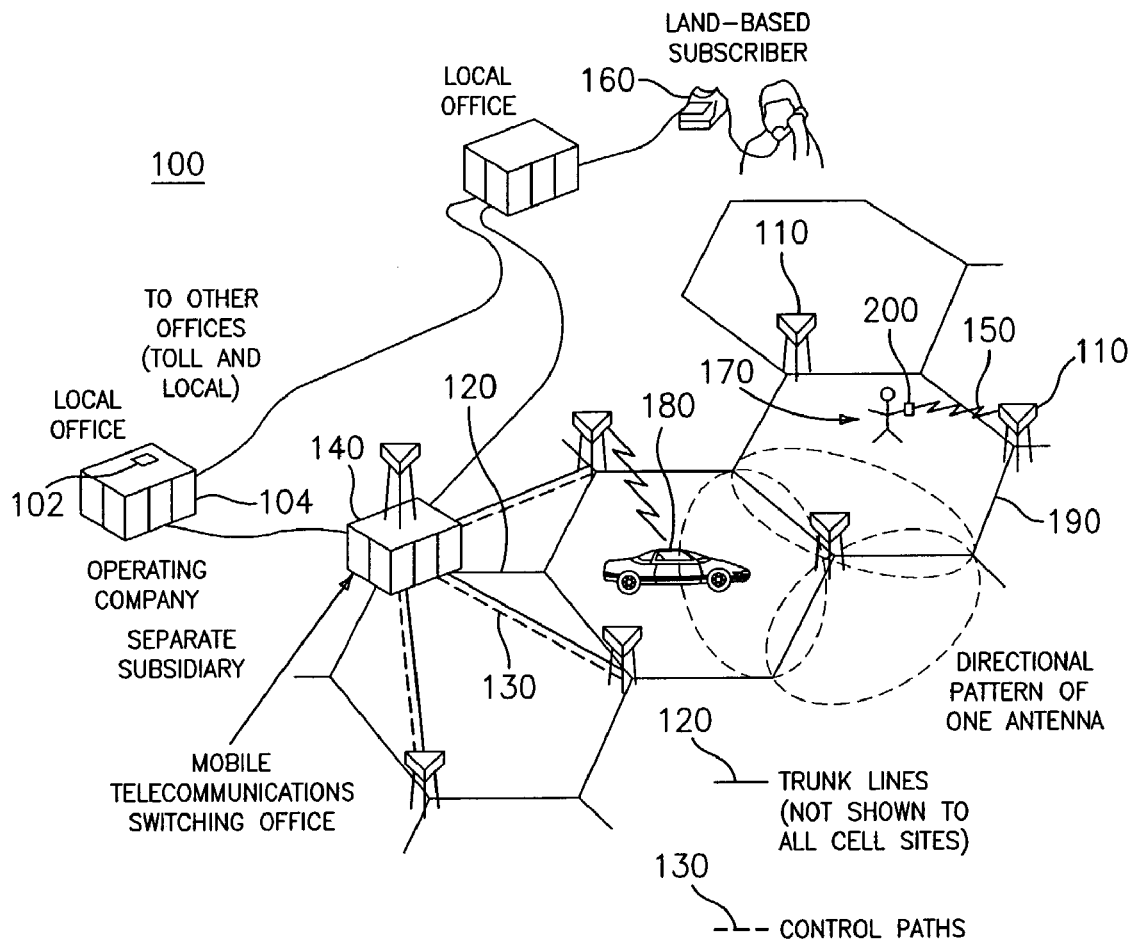
FIG. 1 depicts an exemplary cellular telephone system for implementing an embodiment of the invention.

FIG. 1 is an exemplary embodiment of a Cellular Telephone System (CTS) 100 having a network of cell sites 110 in signal communication, via data and voice channels (trunk lines) 120 (not all channels shown) and control paths 130, with a Mobile Telecommunications Switching Office (MTSO) 140 (also referred to as a Mobile Switching Center, MSC). The cell sites 110 are in signal communication via RF (Radio Frequency) signal 150 with a mobile unit 200 held by user 170. Mobile unit 200 may also be operable within an automobile 180, or any other transportation means. Each cell site 110 contains a tower, an antenna, a radio transceiver and a base station controller (collectively 110) that manages, sends, and receives traffic to and from a mobile unit 200 in its geographical area defined by grid 190 from and to MSC 140. MSC 140 places calls from mobile unit 200 to land based telephones 160, switches calls between cells as mobile units 200 travel across cell boundaries 190, and authenticates the Mobile Identification Number (MIN) of mobile unit 200. MSC 140 is in signal communication with a Local Office (LO) 104, which is in signal communication with many MSCs and many land based telephones 160. LO 104 includes a processing center 102 for processing incoming and outgoing calls.

In accordance with an embodiment of the invention, a wireless emergency call, generally referred to as a WE911 call in the United States, is received from mobile unit 200 at MSC 140, sent to LO 104, processed at processing center 102, and routed to the appropriate PSAP 160 for the caller 170 in accordance with an embodiment of the invention. Depending on the shape of the PSAP boundary, the appropriate PSAP 160 may not necessarily be the closest PSAP 160. Numeral 160 refers to a land based telephone generally and to a PSAP specifically. To accomplish the desired routing of the emergency call to a PSAP 160 in the local region of the caller 170, it is desirable to have the call routed according to information relating to the geographical location of the caller 170, as will be discussed in more detail below.

Figure 2:
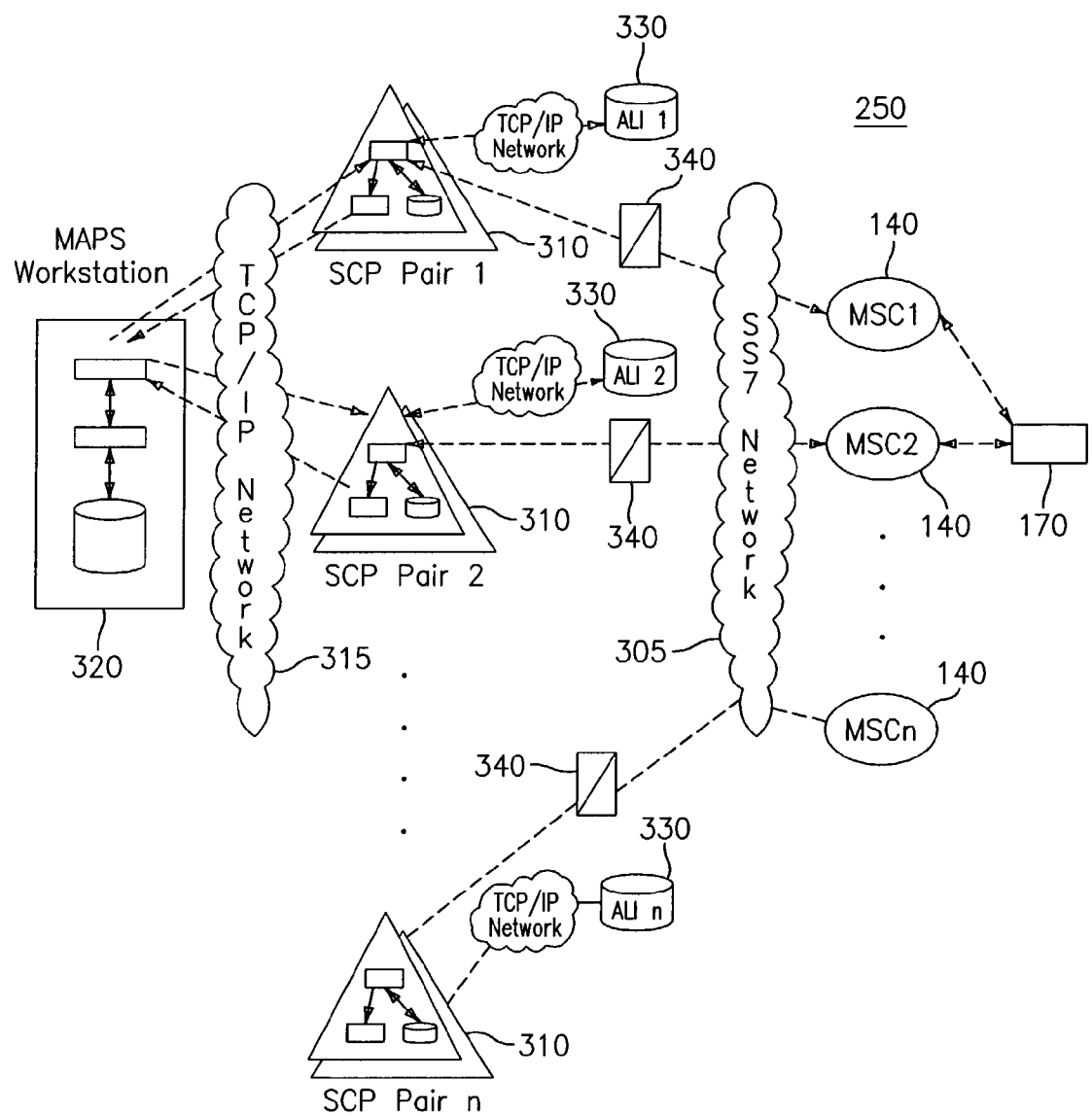
FIG. 2 depicts an exemplary communication system in accordance with an embodiment of the invention.

Referring now to FIG. 2, which depicts a communication system 250 for implementing an embodiment of the invention, a user 170 initiates an emergency (911) call at cell site 110 from mobile unit 200. Upon receipt, the call is handled by MSC 140 that is in signal communication with cell site 110. MSC 140 may be one of multiple MCSs (i.e., MSC1, MSC2, . . . MSCn) that could have been involved in the call, depending on the geographical location of caller 170. Communication of the call signaling information from MSC 140 is received at a dedicated Service Control Point (SCP) pair 310 at LO 104 through Signaling System 7 (SS7) network 305.

Figure 3:
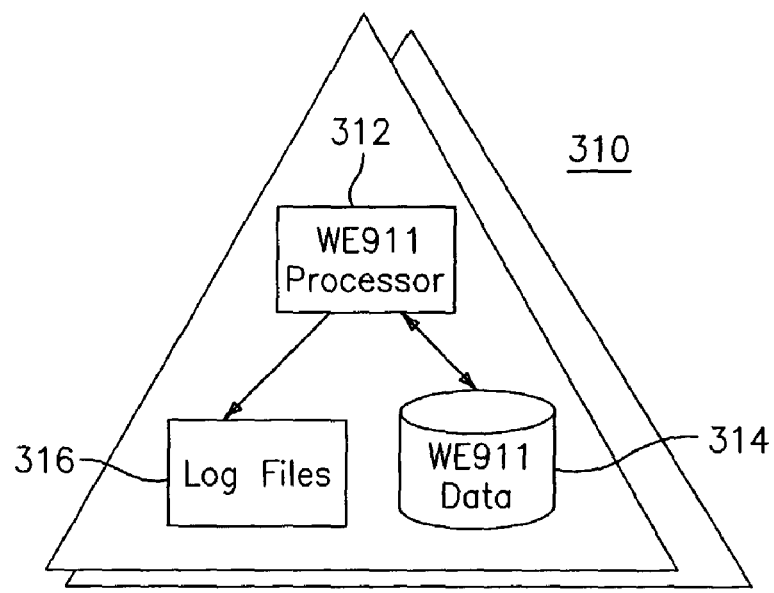
FIG. 3 depicts an exemplary processing facility referred to as a service control point pair for use in the system of FIG. 2.

An SCP pair 310, depicted in FIG. 3, is an Advanced Intelligent Network (AIN) node that typically includes interconnected computers (processors) 312 that provide service execution logic, store 911 emergency call data at a database 314, and specifically 911 emergency call data relating to wireless communication systems, and store emergency call information at log files 316. The SCP pair 310 is configured as a pair of interconnected Service Control Points, thereby providing system redundancy for enhanced reliability. However, since system redundancy may be accomplished by various means, such as by using three SCPs or by employing redundancy features within a single SCP, for example, SCP 310, as used herein, is representative of an SCP pair or any number of SCPs in a reliable configuration. Each SCP 310 is arranged in signal communication with each of those MSCs that are located in the SCP's defined geographic area of coverage, thereby providing general knowledge to SCP 310 regarding the general geographic location of mobile unit 200 depending on which MSC 140 communicated the call. The efficiency of system 250 is substantially improved if each SCP 310, with its geographic database 314, is deployed in a defined geographic area, such as one per state for example, with each location containing the geographic data pertinent to that coverage area.

Figure 4:
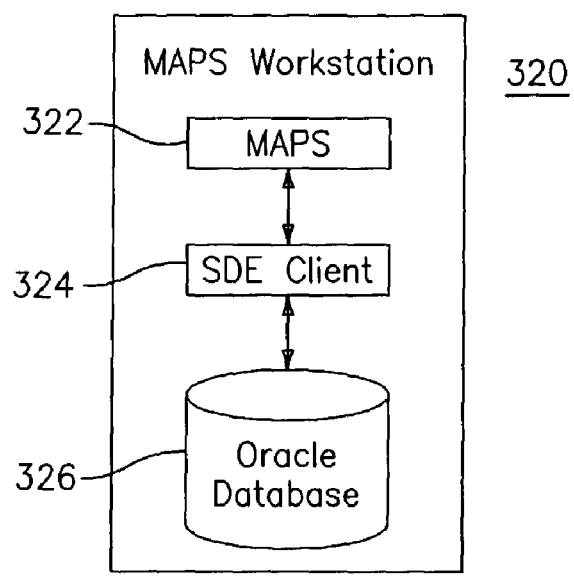
FIG. 4 depicts an exemplary processing facility referred to as a map allocation provisioning system for use in the system of FIG. 2.

A Map Application Provisioning System (MAPS) 320, depicted in FIG. 4, which typical runs on a workstation but may run on any computer system suitable for implementing an embodiment of the invention, is in signal communication with those SCPs 310 that are part of system 250. In an embodiment, MAPS 320 is arranged as an off-line system, rather than a real-time system, to define PSAP boundaries. Network 315, which may be a TCP/IP network or any other network arrangement suitable for implementing an embodiment of the invention, connects SCP 310 with MAPS 320. MAPS 320 includes a processor 322 for running the MAPS application software, and Specific Database Engine (SDE) software 324 for managing database 326, which stores, among other data, spatial geographic data for the geographic area of coverage that encompasses MSC 140, SCP 310, and PSAP 160. MAPS 320 serves as a repository for information defining the boundaries of each PSAP covered by the SCP, and periodically communicates updated information back to the respective SCP 310 for call processing. Embedded software in an Automatic Location Identification (ALI) database 330 enables a PSAP user 160 to query or analyze the results created by relational database 326 in the form of a geographic map, thereby enabling the visualization of the location of the caller 170. Log file 316 tracks emergency call routing information flowing through SCP 310.

SCP 310 receives signaling information related to an emergency call through MSC 140, including the geographic location of the caller. Based on the stored geographic boundaries, SCP 310 determines the correct PSAP 160 for the caller, which is discussed in more detail below, and then provides information for the MSC to route the emergency call to the appropriate PSAP 160 and sends location information to an ALI database 330, which includes, among other data, information relating to the location of the caller 170. In addition to MSC 140 and SCP 310, system 250 also typically includes a Signal Transfer Point (STP) 340, which receives a WE911 query message from MSC 140 and routes the query to SCP 310. Typically, STPs 340 route messages based on two factors, the type of service, or type of call, the query is providing (referred to as the Translation Type), and the NPA-NXX associated with the query. Depending on the service being provided, this NPA-NXX may be that of the calling number or of the called number. In an embodiment of the invention, additional geographic information is used in conjunction with the Translation Type to route the WE911 message through STP 340 to the correct SCP 310 in the geographic region of the caller.

In an embodiment, the additional geographic information is provided by a parameter, such as Geographic Location Code (GLC), for example, that is included in the WE911 signaling message by MSC 140. This code indicates the state, or other divisional area, in which MSC 140 is located. STP 340 is then configured to use the Translation Type and this GLC to determine the routing of the WE911 message.

In an alternative embodiment, MSC 140 includes a "pseudo number" associated with cell site 110 in the WE911 signaling message. This "pseudo number" is related to the geographic location of cell site 110. STP 340 is then configured to use the Translation Type and the NPA-NXX of the "pseudo number" to determine the routing of the WE911 message.

Figure 5:
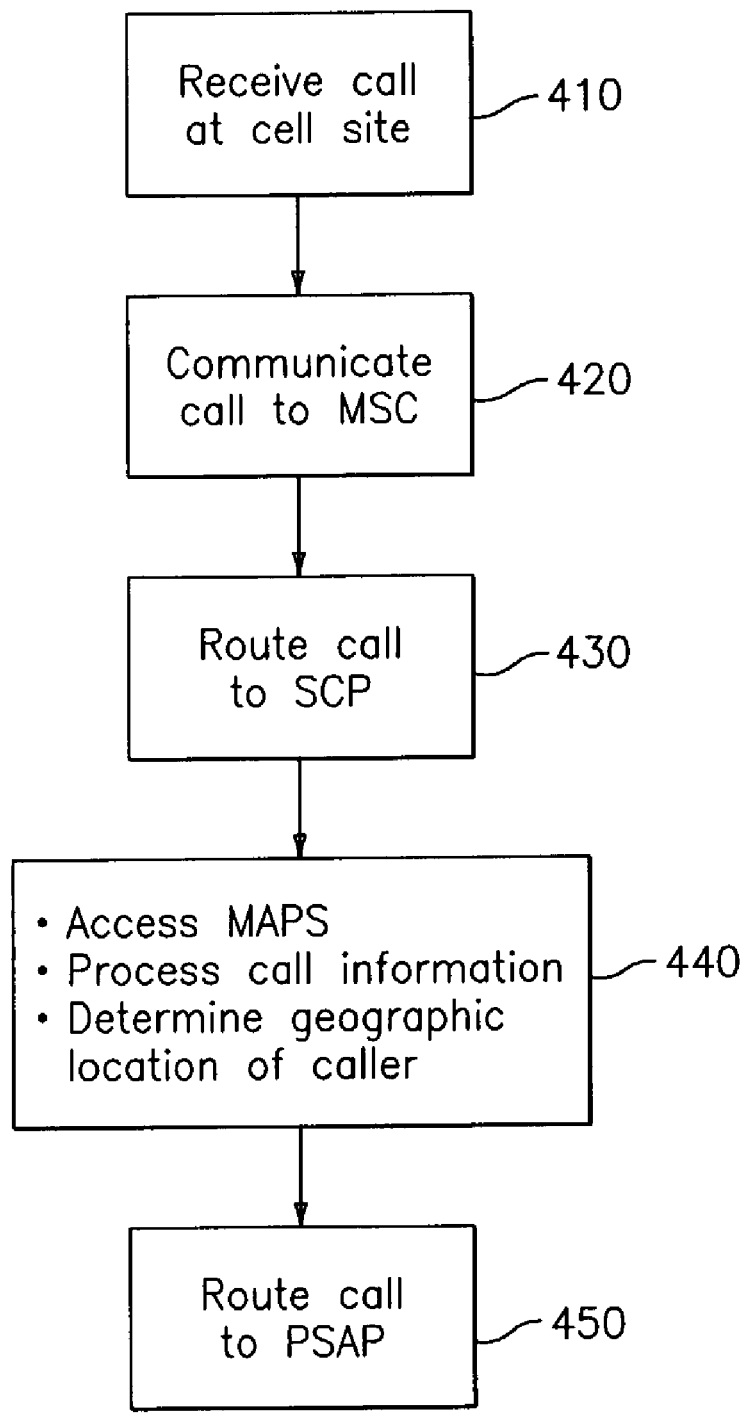
FIG. 5 is an exemplary method for routing a telephone call in accordance with an embodiment of the invention.

Referring now to FIGS. 1, 2 and 5, embodiments for determining the geographical position of mobile unit 200, and caller 170, will now be described.

In general, and with reference to FIG. 5, which depicts a method 400 for routing an emergency call, a call is received 410 at cell site 110 from mobile unit 200 and communicated 420 to MSC 140. MSC 140 routes 430 the call to SCP 310 at LO 104. Since SCP 310 is in signal communication with MSC 140, as discussed above, the general geographic location of mobile unit 200 is known. However, in addition to establishing the general geographic location of mobile unit 200, a further determination 440 is made regarding the geographic location of mobile unit 200, discussed in detail below. After the geographic location of mobile unit 200 has been determined, the emergency call is routed 450 to the PSAP 160 serving the caller 170. At block 440 of method 400, SCP 310 accesses MAPS 320 to upload processing data, processes the collective data (call data and uploaded data) to establish the geographical location of the caller and to determine the appropriate PSAP 160 to the caller, and then routes 450 the call to that PSAP 160.

In determining 440 the general geographic location of mobile unit 200, and therefore of caller 170, SCP 310, after receiving the call from MSC 140, accesses MAPS 320 with information identifying the associated MSC 140, and receives in return information from database 326 correlating MSC 140 with its geographic location. MAPS 320 also provides SCP 310 with information from database 326 identifying the appropriate PSAP 160 with respect to the caller 170. By having a centralized database 326 of information, system 250 can be reconfigured with different associations between MSCs 140 and SCP 310 without having to reconfigure every SCP 310. A centralized database 326 also enables system 250 to be reconfigured with additional or fewer PSAPs 160 depending on how the demographics of the area change. The information received from MAPS 320 is uploaded into database 314 at SCP 310 and processed at processor 312. SCP 310 also creates an emergency call log file 316 that may be used by a system administrator for monitoring system 250 operation. The processed information at SCP 310 results in the call and associated information being routed to the appropriate PSAP 160 with respect to mobile unit 200 and caller 170. SCP 310 also routes call information to ALI database 330.

An alternative embodiment for determining 440 a more specific geographic location of mobile unit 200 includes the use of a Global Positioning System (GPS), which is incorporated into mobile unit 200. In response to a call, and specifically to an emergency call, being placed from mobile unit 200, a latitude and longitude identifier from the GPS is embedded within the protocol of the call sent by MSC 140. This information, along with the known geographic location of MSC 140 in database 314, is passed to SCP 310 for processing. SCP 310 accesses MAPS 320 for geographic data relating to PSAPs 160, and then processes the collective data to determine the appropriate PSAP 160. SCP 310 then routes 450 the call to the appropriate PSAP 160 and to ALI database 330. Alternatively, the longitude and latitude of the caller are dynamically inserted into ALI database 330, such that PSAP 160 can answer and respond to a WE911 call without requiring additional workstation capability.

Another alternative embodiment for determining 440 a more specific geographic location of mobile unit 200 includes the use of triangulation technology, which is incorporated into the software running on processor 312 at SCP 310. The reception of a call placed from mobile unit 200 is typically received by more than one cell site 110, with the signal strength at each receiving cell site 110 being determinable. Signal strength information communicated to MSC 140 is passed to SCP 310 and used along with data from MAPS 320, as discussed above, for determining the appropriate PSAP 160 to the caller 170. SCP 310 then routes 450 the call to the appropriate PSAP 160 and to ALI database 330. In an alternative embodiment, signal strength information from cell sites 110 is used by itself and without triangulation analysis. Here, the geographic location of mobile unit 200 is based on the cell site 110 having the strongest call signal strength.

As discussed, embodiments of the invention provide PSAP 160 with information relating to the geographical location of mobile unit 200, which may be based on the geographic location of MSC 140, or based on signal-related information received at cell sites 110. By either method, the geographical location of mobile unit 200 is determined independent of the number plan area (NPA) code associated with mobile unit 200. Accordingly, and in accordance with an embodiment of the invention, a mobile unit 200 having a NPA code associated with a first geographical region but being in a second geographical region, will have an emergency call originating from the mobile unit 200 in the second geographical region routed to a PSAP 160 more appropriate to the mobile unit 200 in the second geographical region.

Additionally, system 250 of FIG. 2 may also include multiple SCPs 310 for a given geographic region, thereby enabling each SCP 310 to route a different portion of the data from MAPS 320, which would enhance the response time of emergency personnel dispatched from PSAP 160 to an emergency cellphone call made from mobile unit 200.

Embodiments of the invention are further exemplified by the following example.

Assume there are three wireless callers: Caller-A, Caller-B, and Caller-C. Caller-A is a Georgia resident and the handset number is 404-xxx-xxxx. Caller-B's handset is registered in Louisiana and the number is 318-xxx-xxxx. Caller-C's handset number is 334-xxx-xxxx and it is registered in Alabama. SCP1 contains Georgia subscribers' data. SCP2 has Louisiana subscribers' data. SCP3 contains subscribers' information in Alabama.

When Caller-A, Caller-B, and Caller-C make 911 calls in Georgia, existing technology using MSC routes Caller-A's call through STP to SCP1 in Georgia based on Caller-A's NPA (Number Plan Area Code) 404, Caller-B's call through STP to SCP2 in Louisiana based on Caller-B's NPA 318, and Caller-C's call to SCP3 in Alabama based on Caller-C's NPA 334. Hence, while all three calls originated in Georgia, they are routed to different SCPs, based on their registered NPA number, and to different PSAPs.

In an embodiment of the invention, which uses geographic location information instead of NPA information, the routing process routes all three calls to SCP1 in Georgia, since the calls were initiated in Georgia. If the calls originated in Louisiana, then the routing process would route the calls to SCP2 in Louisiana. Hence, in accordance with an embodiment of the invention, all three calls are routed to the same PSAP in the caller's state, which is the desired destination.

Some embodiments of the invention have the following advantages: the ability to efficiently locate a caller based on the geographical region from where the call was placed; the effective routing of an emergency call to a public safety answering point closest to the caller; the dispatch of emergency personnel from a public safety answering point closest to the caller; improved system efficiency through the use of multiple service control point pairs; effective visualization of the location of the caller using display maps; enhanced system reliability through the use of service control point pairs; the ability to monitor system operations through the use of log files; and, a centralized database for ease in implementing system updates and reconfigurations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of routing a telephone call, comprising:

receiving the call at a mobile switching center from a mobile unit in signal communication with a cellular telephone system;

directing the call from the mobile switching center to a redundant service control point, each mobile switching center directing calls to a single redundant service control point in response to a geographic location of the mobile switching center, the redundant control point implement by multiple service control points implementing common features or a single service control point employing redundant features;

in response to the call, the redundant service control point accessing a portion of a geographic database, portions of the geographic database being uniquely associated with respective redundant service control points wherein each of the redundant service control points accesses a geographic database containing only the geographic data pertinent to a coverage area for each redundant service control point; and the redundant service control point routing the call based at least partially on the geographical location and independent of the number plan area code of the mobile unit;

wherein routing the call includes routing the call to a public safety answering point servicing the geographical area of the mobile unit.

2. The method of claim 1, further comprising:
generating a log of the routed call.

3. The method of claim 1, further comprising:
determining the geographical location of the mobile unit based at least partially on at least one of a geographic location code, a pseudo number, a global positioning system, a signal strength, and a signal triangulation process.

4. The method of claim 1, further comprising:
providing the public safety answering point with information relating to the geographical location of the mobile unit.

5. The method of claim 1, further comprising:
routing the call to a public safety answering point in the geographical area of the mobile switching center.

6. The method of claim 1, further comprising:
adding a geographic identifier to the protocol of the call; and
determining the geographical location of the mobile unit based at least partially on the geographic identifier.

7. The method of claim 6, further comprising:
routing the call to a public safety answering point in the geographical area associated with the geographic identifier.

8. The method of claim 1, wherein said receiving further comprises:
receiving an emergency call.

9. A system for routing a telephone call, comprising:

a mobile switching center adapted to receive the telephone call from a mobile unit;

a signal transfer point in signal communication with the mobile switching center; and a redundant service control point in signal communication with the signal transfer point, the mobile switching center directing calls to a single redundant service control point in response to a geographic location of the mobile switching center, the redundant control point implement by multiple service control points implementing common features or a single service control point employing redundant features;

the service control point designated to service a defined geographic area and having access to a portion of a geographic database, portions of the geographic database being uniquely associated with respective redundant service control points, the geographic database containing only geographic data relating to at least one of the mobile switching center, the redundant service control point, and a public safety answering point in the defined geographic area, the redundant service control point routing the call to the public safety answering point servicing a geographical area identified in the geographic data.

10. The system of claim 9, wherein the redundant service control point comprises:

a processor programmed to run emergency call application software;

an emergency call database adapted to include data uploaded from a shared application database; and a log file adapted to store emergency call routing information.

11. The system of claim 9, wherein the redundant service control point is in signal communication with an automatic location identification database.

12. The system of claim 11, wherein the automatic location identification database includes information relating to at least one public safety answering point.

* * * * *